United States Patent [19]

Geffner

[11] 4,025,128
[45] May 24, 1977

[54] ANTIFRICTION BEARINGS

[76] Inventor: Ted Geffner, 48 Park Ave. East, Merrick, N.Y. 11566

[22] Filed: Nov. 12, 1975

[21] Appl. No.: 631,035

[52] U.S. Cl. .............................................. 308/6 C
[51] Int. Cl.² ........................................ F16C 29/06
[58] Field of Search .................................... 308/6 C

[56] References Cited
UNITED STATES PATENTS

| 3,751,121 | 8/1973 | Geffner | 308/6 C |
| 3,844,628 | 10/1974 | McCloskey | 308/6 C |

FOREIGN PATENTS OR APPLICATIONS 1,930,067 6/1969 Germany ........................ 308/6 C Primary Examiner—Joseph F. Peters, Jr.
Assistant Examiner—Gene A. Church
Attorney, Agent, or Firm—Bauer, Amer & King

[57] ABSTRACT

Antifriction bearings for transmitting forces between race members movable rectilinearly and rotatively relative to each other in which the bearing elements move to and from bearing positions in closed loop paths that are continuous and extend uninterruptedly for substantially the full effective bearing length of spaced lands on one of the race members.

14 Claims, 7 Drawing Figures

U.S. Patent  May 24, 1977  4,025,128
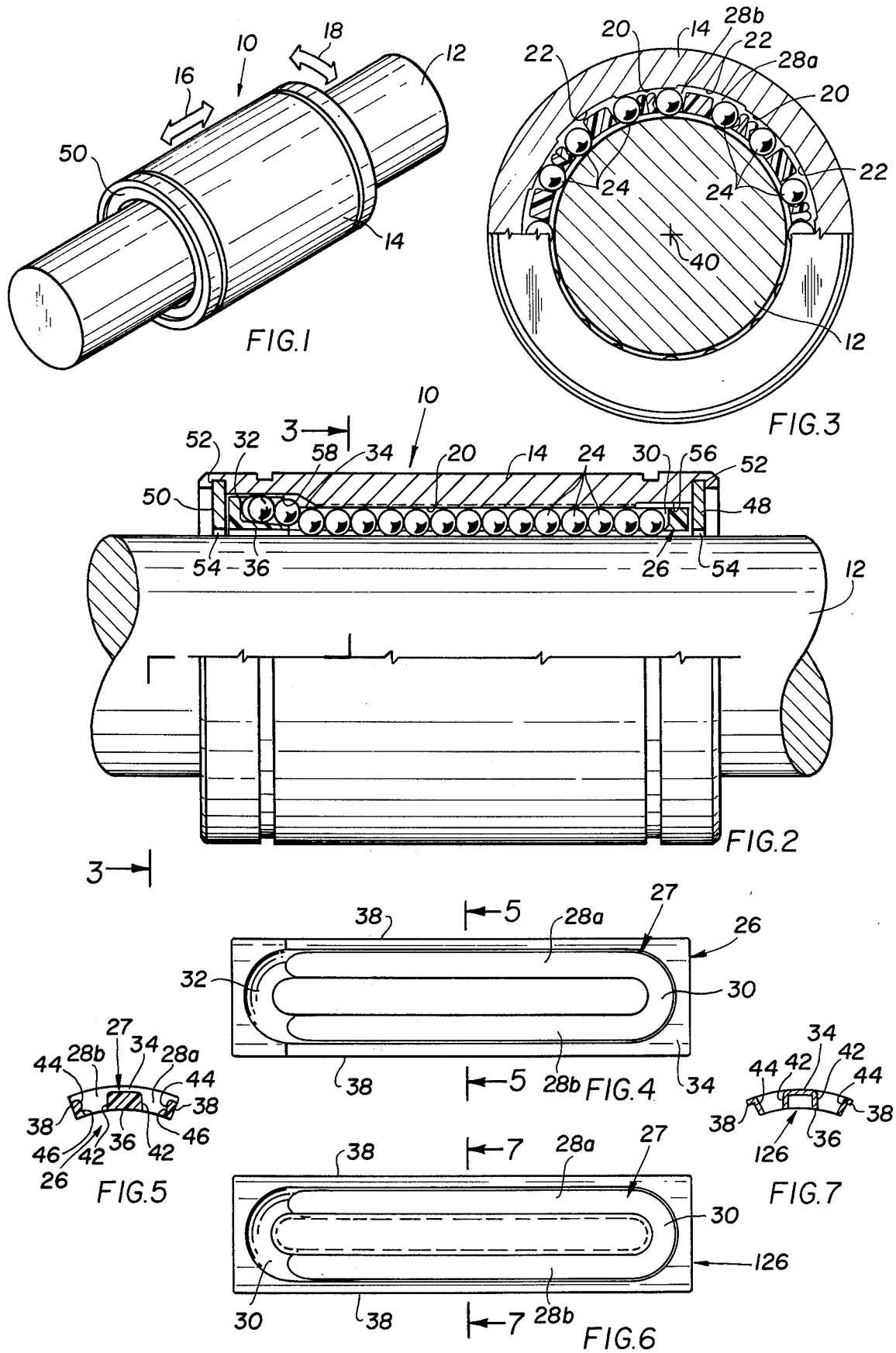

ANTIFRICTION BEARINGS

This invention relates to improvements in antifriction bearings for providing greater and more even distribution of forces between race members that move rectilinearly and rotatively relative to each other.

Bearings exemplary of the type to which the present invention relates are disclosed in U.S. Pat. Nos. 3,037,821 and 3,582,160 to Schutz, and applicant's U.S. Pat. Nos. 3,446,540, 3,692,371 and 3,751,121, and to British Pat. No. 863,497.

In the prior art referred to above, the force transmitting bearing elements were divided between a plurality of closed loop paths, each of which were substantially and materially shorter or of lesser extent than the bearing lands with which they engaged. As a consequence, it was necessary to provide for a complicated spacing of bearing paths in an attempt to assure that the frictional bearing forces were transmitted as smoothly and as evenly as possible between the race members.

The desideratum of the present invention is to provide an antifriction bearing that obviates the aforementioned problems, one that is extremely simple in structure so that it is manufactured easily and inexpensively without complicated arrangements of bearings and lands, one that is quickly assembled, and one that distributes the bearing forces more evenly about the bearing continuously and without interruption for substantially the full effective length of the bearing while enabling the same to transmit rotary as well as rectilinear motion.

An object of the invention is to provide a bearing in which the forces are transmitted between as many bearing points as possible, continuously and uninterruptedly along the effective bearing lengths of the force transmitting and absorbing members.

Further objects and features of the invention are to enable the transfer and changing of forces between rollable bearing elements so that no one or group of such bearing element supports the forces at any one time or in any one position, thereby enhancing the effective life of the bearing.

In furthering the objects of the invention, it is desirable to provide an arrangement of race members and retainer elements that are easily and readily assembled. To this end, an object and feature of the invention is the use of segmented retainers that are self-contained with closed loop paths in which rollable bearing elements are pre-assembled for ready insertion between the preformed race members and are there retained by simple retainers.

The above description, as well as further objects, features and advantages of the present invention, will be more fully appreciated by reference to the following detailed description of a presently preferred, but nonetheless illustrative, embodiment in accordance with the present invention when taken in conjunction with the accompanying drawings wherein:

FIG. 1 is a perspective view of a bearing constructed according to the teaching of the invention;

FIG. 2 is a plan view of the bearing shown in FIG. 1 with a section thereof removed;

FIG. 3 is a cross section of FIG. 2 taken along lines 3—3;

FIG. 4 is a plan view of a retainer segment constructed according to the invention;

FIG. 5 is a cross section of FIG. 4 taken along lines 5—5;

FIG. 6 is a plan view of a modified retainer segment; and

FIG. 7 is a cross section of FIG. 6 taken along lines 7—7.

Referring now to the drawing and in particular to FIG. 1 thereof, the antifriction bearing there shown is generally identified by the numeral 10. It comprises inner and outer race members 12 and 14. In the drawing, the inner race member is illustrated in the form of a shaft. However, those skilled in the art will recognize that the same need not be a solid member as shown. The outer race member 14 is in the form of a housing in that it encloses or encompasses a circumferential and lengthwise extent of the inner race member 12. The housing 14 may be of any desired axial length for whatever purpose the same may be required to perform.

Because the present bearing 10 is described as having rectilinear as well as rotary motions, either the housing 14 or the shaft 12 may move rectilinearly in the direction of arrow 16. Thus, it is possible that the shaft 12 will rotate about its longitudinal axis while the housing 14 may move rectilinearly with respect thereto or vice versa. Or it is possible that both the inner and outer race members can have rectilinear movements of their own in the direction of the arrow 16. In like manner either one or both of the inner and outer race members 12 and 14 may have full rotation in the direction of the arrow 18 or a partial arcuate rotation relative to each other.

In carrying out the objects of the present invention, it is most desirable to provide for as many bearing points between the inner and outer race members as is possible. In this regard, one of the race members is provided with distinct bearing lands, as the lands 20. In the present invention, the lands 20 have been provided on the inner surfaces of the outer housing or race member 14. It should be apparent that the lands 20 could be provided on the outer periphery of the inner race member 12. However, for ease of description only, the arrangement of structure as illustrated in the drawing will be discussed in this disclosure. The lands 20 extend for a substantial portion of the effective bearing length of the inner and outer race members as is illustrated more clearly in FIG. 2. Because the lands are formed on the inner periphery of the race member 14, they are arcuate in width or in cross section.

Each of the lands 20 is alternately spaced from the other about the inner periphery of the race member 14 by a plurality of relatively alternately spaced recesses 22 also defined in the member 14. The alternately arranged recesses and bearing lands 22 and 20, respectively, are arcuately arranged about the inner periphery of the member 14 and each extends for at least the full effective bearing length of the bearing 10.

Positioned between the inner and outer race members 12 are force transmitting rollable bearing elements 24. The rollable bearing elements 24 are in the form of ball bearings which are engaged in a specific bearing relationship between the race members by retainer means generally identified by the numeral 26 in FIGS. 4 and 5. The retainer means 26 are formed in segments of an arc, there being a sufficient number of such segments to completely fill the space that is defined between the inner race member 12 and the outer race member 14. Each retainer segment 26 is but a part of a complete circle of segmented retainer means 26. Because each retainer segment 26 is the same in construction, that illustrated in FIGS. 4 and 5 will be described in greater detail.

The retainer means 26 is elongated along its length for at least substantially the full effective length of the bearing lands 20 and therebeyond. The retainer means 26 illustrated in FIGS. 4 and 5 each has a closed loop path generally identified as 27 of substantially oval configuration. The path 27 comprises two legs 28a and b that are relatively spaced from each other in an arcuate direction although substantially parallel to each other along their lengths. Each of the legs is joined at one end by a return 30 and at their other ends by a further return 32. In an effort to distinguish the function of the legs 28 and return 30 from that performed by the return 32, it will be noted from FIG. 5 that the legs 28a and b are open at their opposite radial ends.

This permits the ball bearing elements 24, when seated therewithin, to project above the top 34 of the retainer 26 and the bottom 36 of the same retainer so that the same will be capable of simultaneous engagement with and between the inner and outer race members 12 and 14 when the balls positioned in such legs 28a and b are in alignment with the bearing lands 20. For this reason the legs 28 which are open at their opposite radial ends are called bearing pathways. In like manner, the return 30 is called a return bearing pathway because it too permits the balls 24 positioned therewithin to project beyond the top and bottom surfaces 34 and 36 of the retainer means 26. It will be seen from FIG. 4 that the pathways 28 define the extent of the opposite return 32 which is closed at its bottom but open at its top as can be seen more clearly in FIG. 2.

Because each retainer segment 26 cooperates to form parts of a whole retainer ring positioned between the inner and outer race members 12 and 14, their longitudinally extending sides 38 are angled radially toward the center or axis 40 of the bearing. Similarly, the inside walls of each of the legs or pathways 28, identified as 42, are also angled or sloped to cause a narrowing of the pathways 28 to prevent the ball bearing elements 24 from dropping through the retainer. The surfaces 42 cooperate with oppositely facing surfaces 44. The surfaces 44 define a double taper terminating in a central groove 46 that tends to position and seat the ball bearing elements 24 properly in their pathways. The two tapered sides of the surfaces 44 cooperating with the single taper of the surface 42 provide for a triangular positioning or three point support of the ball bearing element 24 in each of the pathways 28 as is seen more clearly in FIG. 3.

Each retainer means segment 26 is a self-contained unit of assembled ball bearing elements 24 positioned therewithin and for the full extent thereof. Each of the ball bearing elements 24 may be preassembled within the retainer means 26 and thereafter easily and quickly inserted into the circumferential space between the inner race member 12 and the outer race member 14. From the illustration in FIG. 2, it will be seen that each assembled retainer segment 26 containing its complement or set of ball bearing elements 24 therein may be inserted, by sliding the same into the space between the inner and outer race members, until such time as the retainer means 26 abuts and is stopped by a closure ring 48.

Because the ball bearing elements 24 are readily supported and contained within their respective retainer means 26, they are more easily and conveniently handled until such time as the space between the inner and outer race members 12 and 14 is completely filled with assembled retainers and ball bearing elements. At that time, the opposite end of the bearing structure 10 may be closed by a restricting retainer 50 which, like the closure 48, may seat within a simple undercut 52 provided within the housing 14. The cooperation of the two closures 48 and 50 prevents the retainer means for displacement from between the inner and outer race members as described. In practice, the closure means 48 and 50 may be wiper seals which would extend into wiping engagement with the inner race member 12. Hence, the space 54 as shown between the closure members 48 and 50 and the inner race member 12 may be considered to depict the wiper of the closure members so as to seal the internal structure of the bearing 10 from external deteriorating elements.

To enable the rollable bearing elements 24 to roll and flow freely and smoothly along the closed loop path 27 of their respective retainer means 26 without restriction and in an unfettered manner, one end of the outer housing 14 is provided with a recess 56 in the area of the return pathway 30. This enables the bearing elements 24 to move through the return passageway 30 by engaging with but only one of the race members 12 and is free of bearing engagement with the outer race member 14. Hence, the bearing elements in the vicinity of the return 30 do not function as load bearing structures. However, as they move beyond the recess 56 and into the extent of the leg pathways 28, they are in a position to function as load bearing elements provided, however, that they are in line with one of the bearing lands 20.

The opposite end of the outer race member 14 is similarly provided with a recess 58. A portion of the recess 58 is free of engagement with the ball bearing elements as the same move initially into and out of the return 32 but because the return 32 is sloped in the manner shown in FIG. 2, the bearing elements 24 at the highest portion of such return engage between the surface 32 of the return and the facing surface of the recess 58 of the outer race member 14. By this arrangement of structure, it will be apparent that the bearing elements moving along the highest point of the return 32 will cause their respective retainer means 26 to move in a direction corresponding to the flow of the bearing elements 24.

Although the retainer means 26 here disclosed is shown as a segment of a circle and requires a plurality of such retainer segments to complete the circle of retainer means between the inner and outer race members, it should be apparent that in practice the segmented retainer means may be substituted for by a retainer means in the form of a continuous ring. Obviously, such ring-shaped continuous retainer means may be slightly more difficult to fill with rollable bearing elements 24 during the assembly. However, this does not constitute a problem since the partial insertion of the ring-shaped retainer means would enable the addition of the bearing element means 24 to their closed loop paths quite readily and without difficulty. Hence, it is within the scope of the present invention to utilize a continuous ring-shaped retainer means 26 rather than a segmented retainer means as shown.

The single continuous ring-shaped retainer means would assume the appearance and configuration of the composite retainer means 26 shown in FIG. 3. Whereas the retainer shown in FIG. 3 shows the segments 26 separate and movable relative to each other, the illustration could be deemed to be that of the single ring-shaped retainer means in which the segments thereof would be joined together at the sides 38. In light of the above, a separate illustration of a single ring-shaped retainer 26 would merely duplicate that shown in FIG. 3 and, therefore, the same would be superfluous.

Whether a single ring-shaped retainer means 26 is utilized or whether the segmented retainer means 26 are utilized, it will be seen that the longitudinal extent of the leg pathways 28a and b are such as to be continuous and uninterrupted in length and that the same extend longitudinally for substantially the full effective length of each of the bearing lands 20. The benefit of this arrangement of structure is that a single closed loop path 27 of which the leg pathways 28 define a part will assure as many points as possible of force transmitting contact between the inner and outer race members. There is, therefore, no necessity to provide a complicated arrangement of closed loop paths between the inner and outer race members as has been found necessary in prior art antifriction bearing structures.

Considering the above description and assuming that the retainer means 26, whether formed of a complete circle of separate arcuate sections 26 as illustrated in FIGS. 4 and 5 or as a single ring retainer means as described above, the plurality of closed loop paths 27 each will have the two aforedescribed substantially parallel longitudinally extending pathway legs 28a and b. The longitudinally extending center lines of the ball bearing elements 24 extending along the length of the legs 28a and b will be spaced from each other in each respective closed loop path 27 an arcuate distance that is greater than the arcuate width of each of the bearing lands 20.

Stated in another way, the arcuate width of the bearing lands 20 will be smaller than the space between the center lines of the pathway legs 28a and b of each respective closed loop path 27 so that the rollable bearing elements 24 in both of the pathway legs 28a and b of their one respective closed loop path 27 cannot be simultaneously engaged between the inner and outer race members. In this regard, it will be clear that at no given time during the operation of the bearing 10 is it possible that the rollable bearing elements 24 in one of the pathway legs 28 can be engaged with a bearing land 20 at the same time as the rollable bearing elements 24 of the other spaced pathway leg 28 of the same closed loop path. As a consequence, it will be clear that the bearing elements 24 of one of the pathway legs 28 of each closed loop path must be out of engagement with a bearing land 20 in the event the bearing elements 24 of the other corresponding pathway leg 28 of the same closed loop path 27 is in bearing engagement with a land 20.

The arrangement described above is necessary. If the rollable bearing elements in the two pathway legs 28a and b of the same closed loop path 27 were simultaneously engaged with one or more bearing lands 20, the bearing elements and lands would be locked against relative rectilinear motion and there could be no free flow of the elements 24 within their respective closed loop path. This would lock up the inner and outer race members and prevent their relative motions and the operation of the antifriction bearings. By providing that the arcuate width of the lands 20 is smaller than the spacings of the center lines of the pathway legs 28a and b of the same closed loop path 27, it is impossible for the bearing elements in both pathway legs 28a and b of one closed loop path to be simultaneously engaged between the inner and outer race members.

Because of the aforementioned arrangement of bearing lands 20 and pathway legs 28 along which the bearing elements 24 flow, the number of bearing lands 20 is unequal to and either one more or one less than the number of closed loop paths 27. This assures the ability to define the arcuate widthwise extent of the bearing lands 20 with respect to the center lines of the pathway legs 28 of each closed loop path 27 and also with respect to the center lines of the pathway legs 28 of the next adjacent closed loop path 27 as described above.

As a result of the unequal relationship of bearing lands 20 and closed loop paths 27, as an example there always could be at least seven lands 20 and eight closed loop paths 27 or nine lands 20 and eight closed loop paths. When using such combinations, at all times there will be a minimum of at least six equally distributed points of bearing contact between the bearing elements 24 and the inner and outer race members 12 and 14. This assures an equal circumferential distribution of the forces between such race members substantially fully uninterruptedly along along the full lengths of the bearing lands 20. This means that the bearing forces transmitted at one lengthwise portion of the bearing 10 will be the same as those distributed at all the other lengthwise portions of the bearing 10. Further, that the forces will be distributed between the facing bearing surfaces of the inner race member 12 and the outer race member 14.

When the bearing 10 is provided with one less land 20 than there are closed loop paths 27, the arcuate extent of each land 20 could be greater than the relative space between the center line of a leg 28a or b of one closed loop path 27 and a next adjacent pathway leg 28a or b of a next adjacent closed loop path. Said differently, the relative space between the adjacent pathway legs of adjacent loops 27 is less than the arcuate extent of the lands 20.

When there are more lands 20 than closed loop paths 27, it is recommended that the arcuate extent of each land should be not greater than the relative space between the center line of a pathway leg 28a or b of one closed loop path a next adjacent leg 28a or b of a next adjacent closed loop path. In other words, the relative space between adjacent pathway legs of adjacent loops 27 should be greater than the arcuate extent of the lands 20.

In the embodiment described in FIGS. 4 and 5, the segmented retainer means 26 was formed as a die cast. By die casting such segmented retainer means, it is possible to produce the same inexpensively in mass numbers with the ability to hold dimensional tolerances closely. In referring to the embodiment of the retainer means segment 126 illustrated in FIGS. 6 and 7, the same may be readily formed by stamping the same inexpensively from metal sheet stock.

In so doing, the construction of the retainer means segment 126 will be substantially the same as that of the die cast segment 26 previously described except that the surfaces 44 would be provided with a straight sloping wall directed substantially radially in a manner opposite to that of the surfaces 42 so that the surfaces 42 and 44 cooperate to narrow at their radially directed lowermost points. This results in a narrowed opening through which the ball bearing elements 24 may not drop but will be retained within the retainer segments. From what has been described herein, it will be recognized that the use of die cast or stamped retainer segments 126 or 26 respectively may be a matter of choice depending upon the production techniques desired to be utilized.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In a rectilinear and rotary motion bearing having relatively spaced first and second race members,
    one of said members having relatively spaced bearing lands,
    rollable bearing elements in said bearing for movement between said first and second race members and movable into and out of engagement with said bearing lands,
    retainer means between and movable relative to said first and second race members and having a plurality of closed loop paths for retaining said bearing elements between said first and second race members, the invention comprising
    said closed loop paths each having a pathway defined therein through which the bearing elements project for rectilinear and rotary rolling engagement with said first and second race members,
    said bearing lands being relatively spaced by recesses defined in said one member,
    and said lands and closed loop paths being unequal in number with said closed loop path extending continuously for substantially the full effective length of said bearing lands,
    each said closed loop path having two of said pathways each of which is relatively spaced from the other an extent greater than the extent of each of said bearing lands and less than each of said recesses.

2. In a bearing as in claim 1,
    wherein said race members are circular and relatively coaxially arranged,
    the pathway of one closed loop path being relatively spaced from the pathway of the next adjacent closed loop path less than the extent of each of said bearing lands.

3. A bearing as in claim 1,
    said retainer means being circular and coaxially arranged between said first and second race members for free rotation relative to said lands and recesses of said one race member and movable rectilinearly relative to the other of said race members.

4. A bearing as in claim 1,
    said retainer means includes a plurality of arcuately shaped relatively movable segments coaxially arranged between said first and second race members for rotation relative to said one race member and movement rectilinearly relative to the other of said race members.

5. A bearing as in claim 3,
    returns at the opposite ends of each of said closed loop paths connecting together said pathways of their closed loop paths,
    one of said coaxial race members having a circular recess at the opposite returns of said closed loop paths to enable the unobstructed movement of the bearing elements about said returns between said race members.

6. A bearing as in claim 2,
    said retainer means including a plurality of arcuately shaped relatively movable segments each having one of said closed loop paths.

7. A bearing as in claim 6
    closure means on opposite axial ends of one of said race members restricting the retainer means therebetween.

8. A bearing as in claim 7,
    said closure means being wiper seals mounted on one of said race members in wiping engagement with the other of said race members.

9. In a bearing as in claim 1,
    and the relative space between adjacent pathways of adjacent closed loop paths being greater than the arcuate extent of said bearing lands.

10. In a bearing having inner and outer circular race members coaxially arranged for relative arcuate and rectilinear movement,
    one of said members having alternating bearing lands and recesses defined therein,
    rollable bearing elements between said race members,
    means retaining certain of said bearing elements coaxially between said race members and for movement each in a respective one of a plurality of closed loop paths in which each of said paths is relatively spaced from the other,
    each said closed loop path having at least two relatively spaced pathways through which the bearing elements therein project for bearing engagement between said race members,
    and said closed loop paths and lands being unequal in number with the relative space between the center line of each pathway of their respective closed loop path being greater than the extent of each said bearing land and less than each of said recesses.

11. In a bearing as in claim 10,
    said closed loop paths extending for substantially the full effective bearing lengths of said bearing lands,
    and said pathways of each of said respective closed loop paths being connected by a return at one of the ends of the paths through which said bearing elements may project for engagement with but one of said race members.

12. In a bearing having inner and outer race members coaxially arranged for relative rectilinear and rotatable movement,
    rollable bearing elements between said members for bearing engagement therewith,
    means retaining said bearing elements for movement in a plurality of respective closed loop paths coaxially between said members and for rectilinear and rotary movement relative thereto,
    bearing lands and non-bearing recesses alternately defined on one of said race members for bearing and non-bearing engagement respectively with said bearing elements,
    each said respective closed loop path having a pathway through which the bearing elements in said respective closed loop path project for engagement with said race members, said pathway of one closed loop path being spaced an extent from the pathway of the next adjacent closed loop path different than the arcuate extent of each of said bearing lands, and said closed loop paths and bearing lands being unequal in number.

13. In a bearing as in claim 12, said retainer means being rotatively movable between said race members and rectilinearly relative to one of said race members, and said closed loop paths each extending continuously and uninterruptedly for substantially the full effective bearing lengths of said bearing lands.

14. In a bearing as in claim 13, each said closed loop path having two said pathways connected by a return pathway whereby the center lines of said two pathways of a respective one of each of said closed loop paths are relatively spaced from each other an extent greater than that of each of said bearing lands.

* * * * *